Oct. 17, 1944.    T. R. SMITH    2,360,735
LAMINATED SEALING RING
Filed Jan. 29, 1943
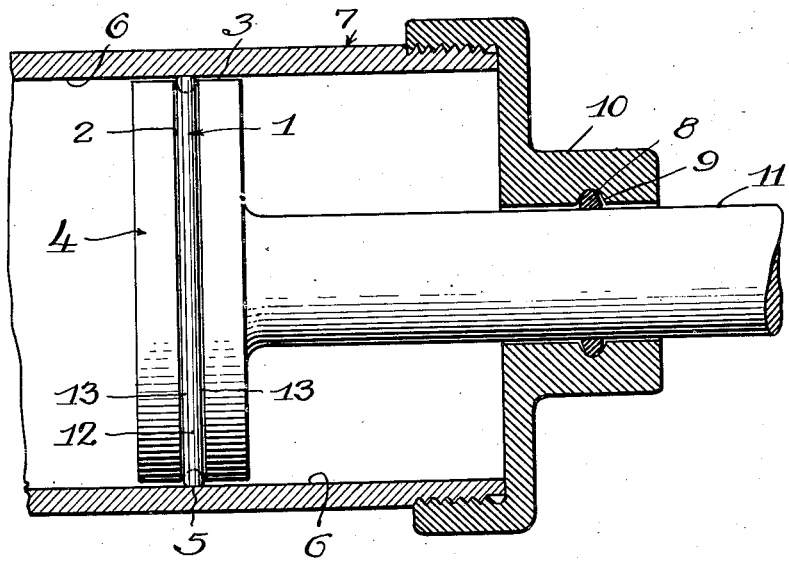
Fig. 1
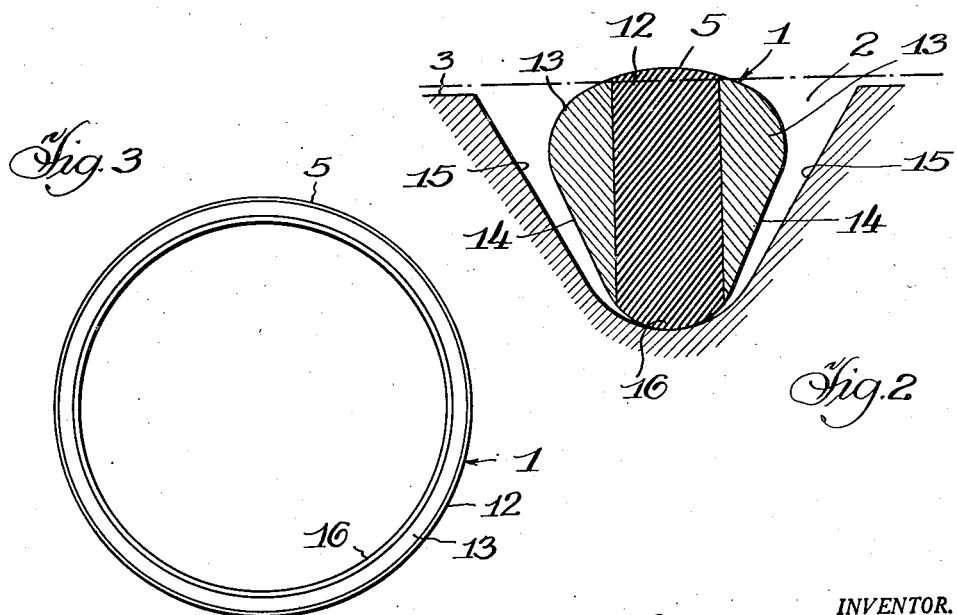
Fig. 3
Fig. 2
INVENTOR.
Thomas R. Smith
BY
Parkinson + Lane
Attys
Witness:
Chas. L. Koursh Patented Oct. 17, 1944

2,360,735

UNITED STATES PATENT OFFICE 2,360,735

LAMINATED SEALING RING

Thomas R. Smith, Newton, Iowa, assignor to The Maytag Company, Newton, Iowa, a corporation of Delaware Application January 29, 1943, Serial No. 473,957

1 Claim. (Cl. 288—4)

The novel invention herein disclosed comprises a sealing ring or packing formed in the nature of a laminated structure of resilient material having a central lamina or layer of relatively low durometer hardness and end laminae or layers of relatively high durometer hardness. These end sections or laminae are so disposed that the central lamina or section of relatively low durometer material provides the sealing face and gives the desired resiliency at relatively low pressures, while the outer laminae or end sections being of a higher durometer hardness will withstand high pressures without extruding, and in addition, will prevent the central section from being extruded between the sealing surfaces.

In actual operation, the maximum pressure which may be sealed is limited by the ability of the material to withstand extrusion. In the present novel embodiment, the higher durometer material is located at the outer corners which are those exposed to the edges being sealed, while the lower durometer material is disposed centrally and maintains a most effective sealing and resiliency at relatively low pressures. Furthermore, this construction has been found to maintain its sealing effectiveness over a longer period of time and through a wider range of pressures than prior constructions.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a view in vertical cross section through a cylinder in which the cooperating surfaces of the cylinder and piston are sealed by the novel sealing ring or packing.

Figure 2 is an enlarged view in vertical cross section through the laminated sealing ring and recess.

Figure 3 is a view in side elevation of the ring or packing.

Referring more particularly to the drawing in which is shown an illustrative embodiment of the present invention, the novel laminated sealing ring or packing 1 is shown as positioned or located within a circumferential recess or groove 2 in the outer cylindrical face 3 of a piston or plunger 4. The external sealing face 5 of the ring is maintained in continuous wiping and sealing contact with the interior 6 of a cylinder 7. A sealing ring or packing 8 similar to that shown at 1 with the exception that the ring 8 is of the internal type, and located within an annular recess or groove 9 provided within the bearing surface of a head or end cap 10 with its sealing face in sealing contact with a reciprocatory piston rod 11.

As shown more clearly in Figure 2, the sealing ring or packing 1, as well as the ring or packing 8, is of laminated construction with the central section 12 thereof of relatively low durometer hardness and the opposite sides or end sections 13, 13 of a higher durometer hardness. The seal or packing is composed wholly of a resilient or flexible material such as a natural or compounded synthetic rubber or rubber-like material molded as an integral unit but with the outer and inner laminations varying in durometer hardness. Excellent results have been secured by making the central section 12 of a durometer hardness varying between approximately 35 and 50 durometer, and the end sections 13, 13 of a durometer hardness varying between approximately 60 and 90 durometer.

In the illustrative embodiment, the sealing ring or packing is shown as of substantially wedge-shape and positioned within the substantially V-shaped groove or recess 2 with the opposite sides 14, 14 of the ring disposed at an angle of approximately 45°, and the opposite sides 15, 15 of the recess 12 disposed at an angle of approximately 60°. This permits the ring or packing to pivot or shift about its vertex 16 as the piston is reciprocated and the fluid being sealed is under pressure.

Having thus disclosed my invention, I claim:

A resilient packing for sealing the space between a pair of relatively movable members one of which is provided with a substantially V-shaped recess for receiving the packing, the packing when assembled in the recess being under radial deformation and of substantially wedge-shape with the angle formed by its opposite sides being substantially less than the angle formed by the substantially sides of the recess, and comprising edgewise laminations of rubber-like material molded together to form an integral unit, the central lamination being of relatively low durometer hardness and the outer laminations being of relatively high durometer hardness but of less resiliency than the central lamination, the opposite ends of the central lamination extending beyond the ends of the outer laminations with one of its opposite ends forming the vertex of the packing about which it pivots, and the other end forming the sealing contact with the other member.

THOMAS R. SMITH.